United States Patent
Nowitzki et al.

(10) Patent No.: US 9,816,519 B2
(45) Date of Patent: Nov. 14, 2017

(54) PRESS-FIT BEARING LOCKING SYSTEM, APPARATUS AND METHOD

(71) Applicant: Summit ESP, LLC, Tulsa, OK (US)

(72) Inventors: Wesley John Nowitzki, Broken Arrow, OK (US); Randy S. Roberts, Tulsa, OK (US)

(73) Assignee: Summit ESP, LLC, Tulsa, OK (US)

( * ) Notice: Subject to any disclaimer, the term of this patent is extended or adjusted under 35 U.S.C. 154(b) by 2 days.

(21) Appl. No.: 15/367,042

(22) Filed: Dec. 1, 2016

(65) Prior Publication Data

US 2017/0159668 A1 Jun. 8, 2017

Related U.S. Application Data

(60) Provisional application No. 62/262,781, filed on Dec. 3, 2015.

(51) Int. Cl.
*F04D 13/08* (2006.01)
*F04D 29/046* (2006.01)
*F16C 35/02* (2006.01)

(52) U.S. Cl.
CPC ......... *F04D 29/046* (2013.01); *F04D 13/086* (2013.01); *F16C 35/02* (2013.01); *F16C 2226/12* (2013.01); *F16C 2226/14* (2013.01); *F16C 2360/44* (2013.01)

(58) Field of Classification Search
CPC ...... F04D 13/086; F04D 29/046; F16C 35/02; F16C 2226/12; F16C 2226/14; F16C 2360/44
See application file for complete search history.

(56) References Cited

U.S. PATENT DOCUMENTS

| | | | |
|---|---|---|---|
| 2,271,336 A | 1/1942 | Goldsmith | |
| 2,678,606 A * | 5/1954 | Watson | F04D 17/122 415/108 |
| 2,926,970 A | 3/1960 | Clark | |
| 3,170,646 A | 2/1965 | Springer | |
| 3,215,083 A | 11/1965 | Sarles et al. | |
| 3,267,869 A | 8/1966 | Vartapetov et al. | |

(Continued)

FOREIGN PATENT DOCUMENTS

CN 102606490 A 7/2012

*Primary Examiner* — Igor Kershteyn
(74) *Attorney, Agent, or Firm* — Frederic Dorwart, Lawyers PLLC; Penina Michlin Chiu

(57) ABSTRACT

A press-fit bearing locking system, apparatus and method is described. A press-fit bearing locking system includes a diffuser having a diffuser groove on an inner diameter (ID), a bushing comprising an outer diameter (OD) press-fit into the grooved ID of the diffuser, the OD of the bushing having a bushing groove tracing a path of the diffuser groove, and a high thermal expansion material (HTEM) key seated within the bushing groove. A press-fit bearing locking method includes seating a HTEM key inside a groove on an OD of a bushing, press-fitting the bushing with HTEM key into a diffuser such that the bushing groove is opposite a groove on an ID of the diffuser, operating an electric submersible pump assembly including the diffuser during a temperature rise, and allowing the HTEM key to expand into the diffuser groove during the temperature rise to lock the bushing against the diffuser.

23 Claims, 9 Drawing Sheets

(56) References Cited

U.S. PATENT DOCUMENTS

| | | | |
|---|---|---|---|
| 3,975,117 A | | 8/1976 | Carter |
| 4,244,675 A | * | 1/1981 | Bower .................... F04D 1/066 |
| | | | 415/135 |
| 4,513,215 A | | 4/1985 | Del Serra |
| 5,128,573 A | | 7/1992 | Liu et al. |
| 5,160,240 A | | 11/1992 | Wilson |
| 5,207,560 A | * | 5/1993 | Urban ....................... F04D 7/06 |
| | | | 277/411 |
| 5,209,577 A | | 5/1993 | Swatek |
| 5,320,431 A | | 6/1994 | Kallenberger |
| 5,722,812 A | | 3/1998 | Knox et al. |
| 5,765,950 A | | 6/1998 | Eno et al. |
| 6,017,184 A | | 1/2000 | Aguilar et al. |
| 6,068,444 A | | 5/2000 | Sheth |
| 6,167,965 B1 | | 1/2001 | Bearden et al. |
| 6,309,174 B1 | | 10/2001 | Oklejas, Jr. et al. |
| 6,547,514 B2 | * | 4/2003 | Lee ....................... E21B 43/128 |
| | | | 415/1 |
| 7,575,413 B2 | | 8/2009 | Semple et al. |
| 7,909,090 B2 | | 3/2011 | Reid |
| 8,066,476 B2 | | 11/2011 | Orban et al. |
| 8,651,836 B2 | | 2/2014 | Parmeter et al. |
| 8,684,679 B2 | | 4/2014 | Tetzlaff et al. |
| 8,721,181 B2 | | 5/2014 | Semple et al. |
| 8,894,350 B2 | | 11/2014 | Brunner et al. |
| 9,325,216 B2 | | 4/2016 | Parmeter et al. |
| 9,353,752 B2 | | 5/2016 | Tetzlaff et al. |
| 2004/0057642 A1 | | 3/2004 | New |
| 2014/0030055 A1 | * | 1/2014 | Jayaram .................... F04D 1/00 |
| | | | 415/1 |
| 2015/0023815 A1 | | 1/2015 | Tetzlaff et al. |
| 2016/0115998 A1 | | 4/2016 | Jayaram et al. |

\* cited by examiner

PRESS-FIT BEARING LOCKING SYSTEM, APPARATUS AND METHOD

CROSS REFERENCE TO RELATED APPLICATIONS

This application claims the benefit of U.S. Provisional application No. 62/262,781 to Nowitzki et al., filed Dec. 3, 2015 and entitled "PRES-FIT BEARING LOCKING SYSTEM, APPARATUS AND METHOD," which is hereby incorporated by reference in its entirety.

BACKGROUND OF THE INVENTION

1. Field of the Invention

Embodiments of the invention described herein pertain to the field of electric submersible pump assembly journal bearings. More particularly, but not by way of limitation, one or more embodiments of the invention enable a press-fit bearing locking system, apparatus and method.

2. Description of the Related Art

Fluid, such as gas, oil or water, is often located in underground formations. In such situations, the fluid must be pumped to the surface so that it can be collected, separated, refined, distributed and/or sold. Centrifugal pumps are typically used in electric submersible pump (ESP) applications for lifting well fluid to the surface. Centrifugal pumps impart energy to a fluid by accelerating the fluid through a rotating impeller paired with a stationary diffuser. A rotating shaft runs through the central hub of the impeller and diffuser. A motor upstream of the pump causes the pump shaft to turn, and the impeller is keyed to the shaft such that the impeller rotates with the shaft.

A conventional ESP assembly includes, from upstream to downstream, a motor, seal section, intake section, and multi-stage centrifugal pump. Production tubing carries the pumped fluid from the centrifugal pump to the well's surface. The assembly components each have a shaft running longitudinally through their centers that are connected and rotated by the motor. In gassy wells, a gas separator or charge pump may also be included in the assembly, typically between the intake and the pump, or in place of the intake. For example, a gas separator may act as the intake of the assembly. In such instances, the gas separator compresses the gaseous fluid and then attempts to separate any unsaturated gas before the fluid passes into the centrifugal pump. Gas separators sometimes include impeller and diffuser stages to increase the pressure of the fluid during compression and separation of gases. Similarly, charge pumps are also sometimes used in tandem with a primary centrifugal pump in gassy wells, and may also employ stages.

During operation, whether in a pump, charge pump or gas separator, pump assembly stages are subject to axial forces in the upward and downward directions, conventionally referred to as "thrust." Downward force or "downthrust" is a result of a portion of the impeller discharge pressure acting on the top of the impeller. Upward force or "upthrust" is a result of a portion of the impeller discharge pressure acting against the bottom of the impeller. A second upward force is the force produced by the momentum of the fluid making its turn in the impeller passageway. Pump assembly stages are also subject to radial forces that can cause the shaft to become misaligned.

To carry the thrust of the pump, thrust bearings are sometimes employed in pump stages. The thrust bearings include a conventional bushing that is pressed into the wall of the conventional diffuser. A sleeve is keyed to the shaft inward of the conventional bushing. As the sleeve rotates inside the conventional bushing, a thin layer of fluid forms in between the sleeve and conventional bushing of the bearing set to provide fluid film lubrication and carry the downthrust loads. The sleeve may further act as a radial support bearing.

Typically, bushings are tightly pressed into the diffuser bore with an interference fit. The outer diameter of the bushing is larger than the diffuser bore, typically by about 0.001-0.003 inches, and is inserted using a lead in chamfer. Frictional forces between the bushing and the surrounding diffuser attempt to keep the bushing from slipping out of place.

During operation of an ESP assembly, the assembly experiences a significant increase in temperature. In a typical instance, an ESP assembly may be about 75° F. when assembled, but increase to 200-300° F. during downhole operations. Some types of ESP systems reach temperatures as high as 600° F. during downhole operations. Since the various pump components are made of different materials from one another, those materials expand at different rates as the pump increases in temperature. Conventionally, diffusers are made of Ni-resist, an austenitic iron alloy, and bushings are made of a composite material such as tungsten carbide, silicon carbide or titanium carbide. The Ni-resist diffuser has a much higher thermal expansion coefficient than the composite bushing, causing the diffuser to expand faster than the bushing press-fit into the diffuser. The result is that the press-fit on the bushing relieves and the bushing dislodges or rotates. Once the bushing dislodges or rotates, it can cause misalignment or undesirable movement that can degrade the overall performance and/or operational life of the pump.

One approach to combating the dislodgement of ESP bushings due to thermal expansion has been to place a Ni-resist retaining ring above the bushing. Because the retaining ring is the same material as the diffuser, it grows in size with the diffuser, keeping the bushing from sliding upwards as the temperature increases. However, this approach is not possible when the bearing needs to provide thrust protection, as the retaining ring cannot provide any thrust load.

As is apparent from the above, current ESP stages employing press-fit thrust bearings do not adequately prevent bearing dislodgement during temperature increases in downhole wells in which those stages are employed. Therefore, there is a need for an improved press-fit bearing locking system, apparatus and method.

BRIEF SUMMARY OF THE INVENTION

One or more embodiments of the invention enable a press-fit bearing locking system, apparatus and method.

A press-fit bearing locking system, apparatus and method is described. An illustrative embodiment of a press-fit bearing locking system includes a rotatable impeller paired with a diffuser, the diffuser having a diffuser groove on an inner diameter of the diffuser, a bushing including an outer diameter press-fit into the grooved inner diameter of the diffuser, the outer diameter of the bushing having a bushing groove, the bushing groove tracing a path of the diffuser groove, and a high thermal expansion material (HTEM) key seated within the bushing groove. In some embodiments, the bushing groove extends circumferentially around the outer diameter of the bushing, and the diffuser groove extends circumferentially around the inner diameter of the diffuser. In certain embodiments, the HTEM key is a C-shaped wire extending around about 90% of the outer diameter of the bushing. In some embodiments, there are a plurality of bushing grooves extending circumferentially around the outer diameter of the bushing, and a plurality of diffuser grooves extending circumferentially around the inner diameter of the diffuser, each of the circumferential bushing grooves tracing a path of one of the plurality of circumferentially extending diffuser grooves. In certain embodiments, the bushing groove extends axially along the outer diameter of the bushing, and the diffuser groove extends axially along the inner diameter of the diffuser. In some embodiments, there are a plurality of axially extending bushing grooves and a plurality of axially extending diffuser grooves, each of the axially extending bushing grooves tracing a path of one of the plurality of axially extending diffuser grooves. In certain embodiments, the plurality of axially extending bushing grooves are spaced circumferentially about the outer diameter of the bushing. In some embodiments, the HTEM key includes a wire. In certain embodiments, the rotatable impeller and the diffuser form a gas separator stage. In some embodiments, the bushing groove extends circumferentially about the bushing and the HTEM key is a wire extending around between 90% and 99% of the outer diameter of the bushing. In some embodiments, the bushing groove extends circumferentially about the bushing and the HTEM key is a wire extending entirely around the outer diameter of the bushing. In certain embodiments, the HTEM key is one of an ethylene propylene diene monomer (EPDM) ring or a rubber elastomeric ring. In some embodiments the press-fit bearing locking system further includes an adhesive between the outer diameter of the bushing and the inner diameter of the diffuser. In some embodiments, a width of the bushing groove is about 50% of a height of the bushing.

An illustrative embodiment of a press-fit bearing locking method includes seating a high thermal expansion material (HTEM) key inside a groove on an outer diameter of a bushing, press-fitting the bushing having the seated HTEM key into a diffuser such that the groove on the outer diameter of the bushing is opposite a groove on an inner diameter of the diffuser, operating an electric submersible pump (ESP) assembly including the diffuser and the press-fit bushing during a temperature rise of the diffuser, and allowing the HTEM key to expand into the diffuser groove during the temperature rise to lock the bushing in position against the diffuser. In some embodiments the press-fit bearing locking method further includes applying a retention compound to the groove on the outer diameter of the bushing prior to seating the HTEM key inside the bushing groove. In certain embodiments, the press-fit bearing locking method further includes applying a grease to the groove on the outer diameter of the bushing prior to seating the HTEM key inside the bushing groove. In some embodiments, the press-fit bearing locking method further includes aligning the bushing groove and the diffuser groove during press-fitting such that the bushing groove traces a path of the diffuser groove. In certain embodiments, seating the HTEM key inside the bushing groove includes stretching an elastomeric ring around the outer diameter of the bushing. In some embodiments, seating the HTEM key inside the bushing groove includes bending a wire around at least a portion of the outer diameter of the bushing. In certain embodiments, seating the HTEM key inside the bushing groove includes placing a wire one of axially or diagonally in the bushing groove.

An illustrative embodiment of a bearing locking system includes a rotatable impeller paired with a diffuser, the diffuser having a diffuser groove on an inner diameter of the diffuser, a bushing comprising an outer diameter secured to the grooved inner diameter of the diffuser, the outer diameter of the bushing having a bushing groove, the bushing groove tracing a path of the diffuser groove, and a volumetrically expandable key seated within the bushing groove. In some embodiments, the outer diameter of the bushing is secured to the grooved inner diameter of the diffuser by one of a glue, a snap ring, or a combination thereof. In certain embodiments, volumetric expansion of the key is liquid-activated. In some embodiments, volumetric expansion of the key is activated by contact with oil. In certain embodiments, the volumetrically expandable key includes ethylene propylene diene monomer (EPDM). In some embodiments, volumetric expansion of the key is one of water or salt activated. In certain embodiments, volumetric expansion of the key is heat activated. In some embodiments, volumetric expansion of the key is at least partially heat activated and at least partially liquid activated. In certain embodiments, the outer diameter of the bushing is secured to the grooved inner diameter of the diffuser by interference fit.

In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings in which.

Figure 1:
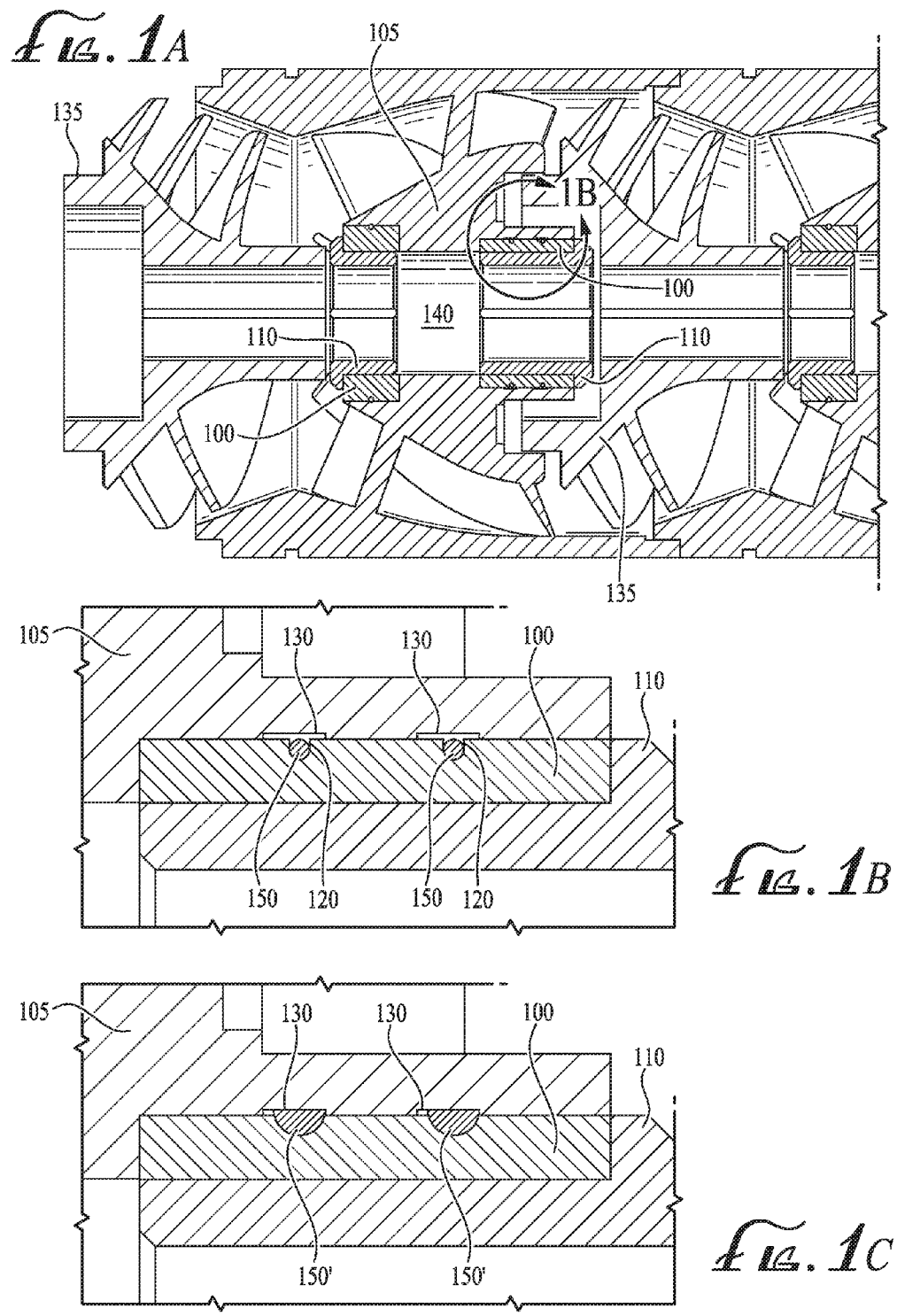
FIG. 1A is a cross sectional view of a stage of an illustrative embodiment.
FIG. 1B is an enlarged view of the stage of FIG. 1A having a room temperature key of an illustrative embodiment.
FIG. 1C shows the stage of FIG. 1B with a volumetrically expanded key of an illustrative embodiment.

While the invention is susceptible to various modifications and alternative forms, specific embodiments thereof are shown by way of example in the drawings and may herein be described in detail. The drawings may not be to scale. It should be understood, however, that the embodiments described herein and shown in the drawings are not intended to limit the invention to the particular form disclosed, but on the contrary, the intention is to cover all modifications, equivalents and alternatives falling within the scope of the present invention as defined by the appended claims.

DETAILED DESCRIPTION

A press-fit bearing locking system, apparatus and method will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

As used in this specification and the appended claims, the singular forms "a", "an" and "the" include plural referents unless the context clearly dictates otherwise. Thus, for example, reference to a key includes one or more keys.

"Coupled" refers to either a direct connection or an indirect connection (e.g., at least one intervening connection) between one or more objects or components. The phrase "directly attached" means a direct connection between objects or components.

As used herein, the term "outer," "outside" or "outward" means the radial direction away from the center of the shaft of the electric submersible pump (ESP) and/or the opening of a component through which the shaft would extend. In the art, "outer diameter" and "outer circumference" are sometimes used equivalently. As used herein, the outer diameter is used to describe what might otherwise be called the outer circumference of a pump component such as a bushing.

As used herein, the term "inner", "inside" or "inward" means the radial direction toward the center of the shaft of the ESP and/or the opening of a component through which the shaft would extend. In the art, "inner diameter" and "inner circumference" are sometimes used equivalently. As used herein, the inner diameter is used to describe what might otherwise be called the inner circumference of a pump component such as a diffuser.

As used herein the terms "axial", "axially", "longitudinal" and "longitudinally" refer interchangeably to the direction extending along the length of the shaft of an ESP assembly component such as a multi-stage centrifugal pump, seal section, gas separator or charge pump.

"Downstream" refers to the direction substantially with the principal flow of working fluid when the pump assembly is in operation. By way of example but not limitation, in a vertical downhole ESP assembly, the downstream direction may be towards the surface of the well.

"Upstream" refers to the direction substantially opposite the principal flow of working fluid when the pump assembly is in operation. By way of example but not limitation, in a vertical downhole ESP assembly, the upstream direction may be opposite the surface of the well.

As used in this specification and the appended claims, "high thermal expansion material," and "HTEM" refer interchangeably to a material having a thermal expansion coefficient greater than that of Type 1 Ni-Resist austenitic cast iron.

One or more embodiments provide a locking system for press-fit ESP journal bearings. While illustrative embodiments are described in terms of an oil and/or gas downhole pumping embodiment, nothing herein is intended to limit the invention to that embodiment. Illustrative embodiments may be equally applicable to horizontal pumps, mixed flow stages, radial flow stages and/or other pumps that employ press-fit bearings and experience large temperature differentials, such as temperature increases of 100° F. or more.

Illustrative embodiments may provide an axial and/or radial locking mechanism for an ESP bearing, such as a thrust and/or radial support bushing of an ESP stage employed in a centrifugal pump, charge pump, seal section or gas separator. Illustrative embodiments may create a mechanical lock around the bushing so that the bushing may not slide out of position (dislodge) as a result of thermal expansion of the surrounding materials and/or when acted upon by gravitational forces, and may not rotate with a paired sleeve and/or the ESP shaft.

An illustrative embodiment of a bearing locking system includes a bushing press-fit into a diffuser with a 0.001-0.003 inch tolerance. The outer diameter of the bushing may include grooves seating an HTEM and/or volumetrically expandable key such as a C-shaped aluminum, zinc and/or steel wire placed inside the bushing grooves. The diffuser may also include grooves opposite to and/or that trace the path of the bushing grooves. As the temperature of the assembly rises, such as during operation of the ESP pump, the HTEM key may expand volumetrically at a faster rate than the diffuser. The expansion of the HTEM key into the grooves may create a mechanical lock to hold the bushing from slipping despite thermal expansion of the diffuser.

FIGS. 1A-1C illustrate a stage of an illustrative embodiment. Each stage of an illustrative embodiment may include a stationary diffuser or carrier mated with a rotatable impeller. The stage of illustrative embodiments may serve as one or more stages in a centrifugal pump, seal section, charge pump and/or gas separator. One or more bearing sets, including a rotatable sleeve and stationary bushing, may be included within an impeller 135 and diffuser 105 stage of illustrative embodiments. As shown in FIGS. 1A-1C, bushing 100 may be press-fit into diffuser 105. Bushing 100 may be pressed tightly into diffuser 105 by interference fit, for example with a 0.001-0.003 inch tolerance. In some embodiments, outer diameter of bushing 100 may be secured to the inner diameter of diffuser 105 by glue or a snap ring. Bushing 100 and/or sleeve 110 may be made of a composite of tungsten carbide, silicon carbide, titanium carbide or another hard, abrasion resistant material that is not exceedingly brittle and/or may have a thermal expansion coefficient of about $2.40 \times 10^{-6}$ in/in/° F. Diffuser 105 may be Ni-resist cast iron and have a thermal expansion coefficient of about $1.04 \times 10^{-5}$ in/in/° F. Each stage may include an upthrust and/or downthrust bearing set. As shown in FIG. 1A, both an upthrust and downthrust bearing set are illustrated, each including bushing 100 and sleeve 110. As shown in FIG. 1A, upthrust sleeve 110 and/or downthrust sleeve 110 may be flanged sleeves providing both thrust and radial support. In some embodiments a flange may be omitted from sleeve 110 to provide radial support. Sleeve 110 may be keyed to shaft 140 such that it rotates with shaft 140.

Figure 2:
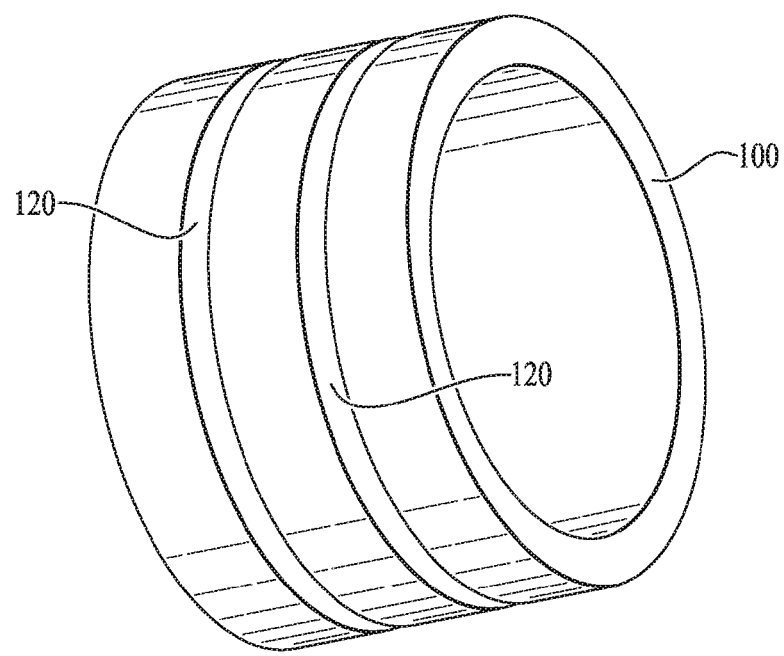
FIG. 2 is a perspective view of a bushing having circumferential grooves of an illustrative embodiment.
Figure 3:
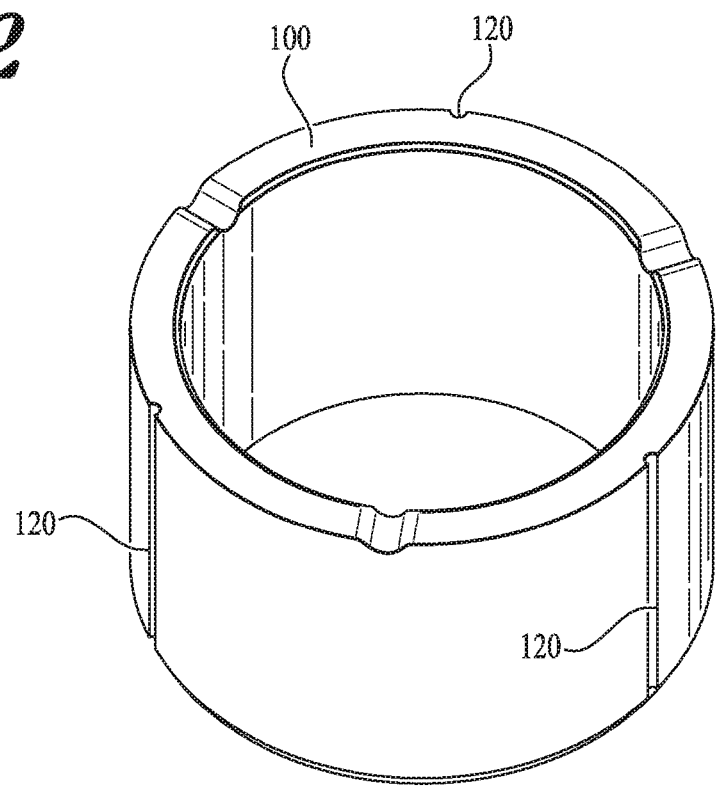
FIG. 3 is a perspective view of a bushing having axial grooves of an illustrative embodiment.
Figure 4A:
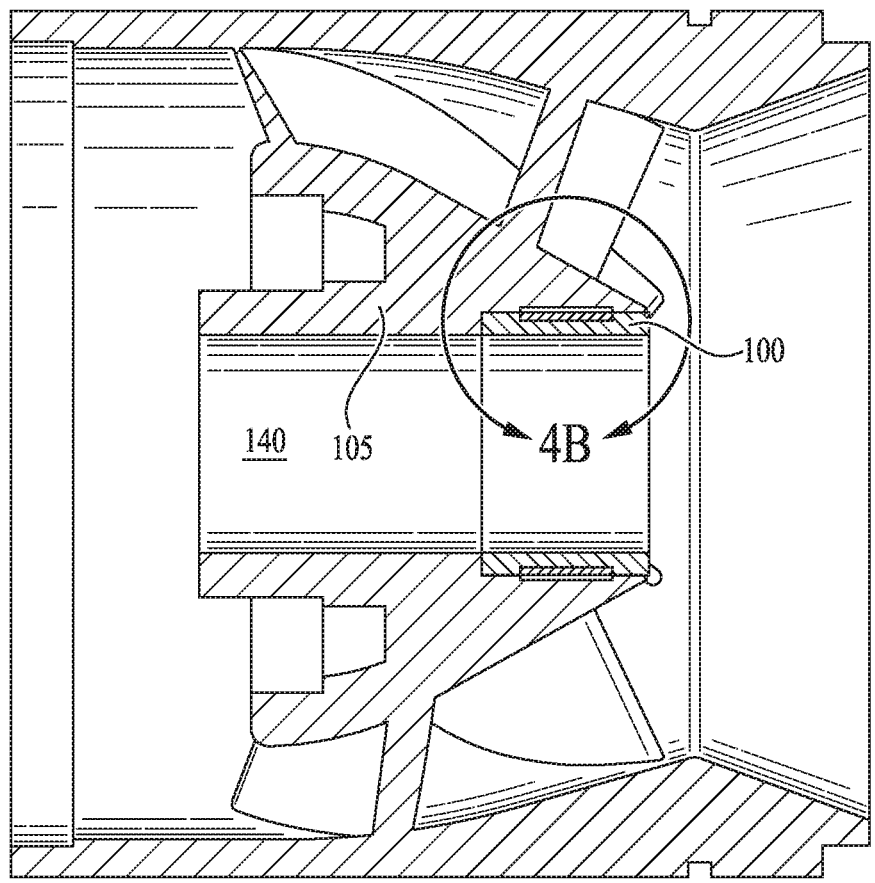
FIG. 4A is a cross sectional view of a stage of an illustrative embodiment having an exemplary cuff-shaped key at room temperature.
Figure 4B:
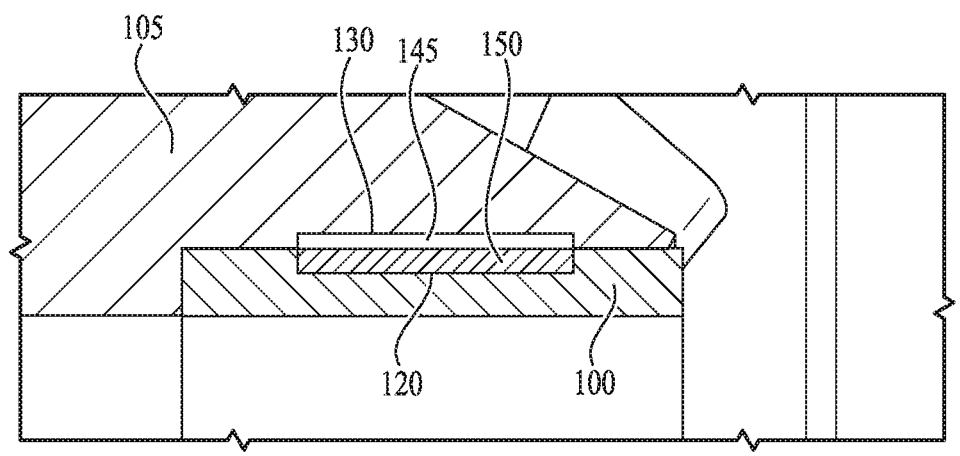
FIG. 4B is an enlarged view of the stage of FIG. 4A of an illustrative embodiment at room temperature.

FIG. 2 and FIG. 3 illustrate bearings of illustrative embodiments. As shown in FIG. 2 and FIG. 3, bushing 100 may include one or more bushing grooves 120 on outer diameter of bushing 100. In the illustrative embodiment shown in FIG. 2, one or more bushing grooves 120 may extend circumferentially around the outer diameter of bushing 100. Where multiple circumferential grooves are employed, circumferential grooves 120 may be spaced apart axially on the OD of bushing 100. In the illustrative embodiment shown in FIG. 3, one or more bushing grooves 120 may extend axially along the outer diameter of bushing 100. Where multiple axial grooves are employed axial grooves 120 may be spaced circumferentially around the OD of bushing 100. In some embodiments, such as shown in FIGS. 4A-4B, only a single bushing groove 120 may be employed. In certain embodiments, rather than bushing 100 having bushing grooves 120, one or more protruding lips may be employed to secure placement of key 150 on bushing 100 outer diameter.

Figure 5:
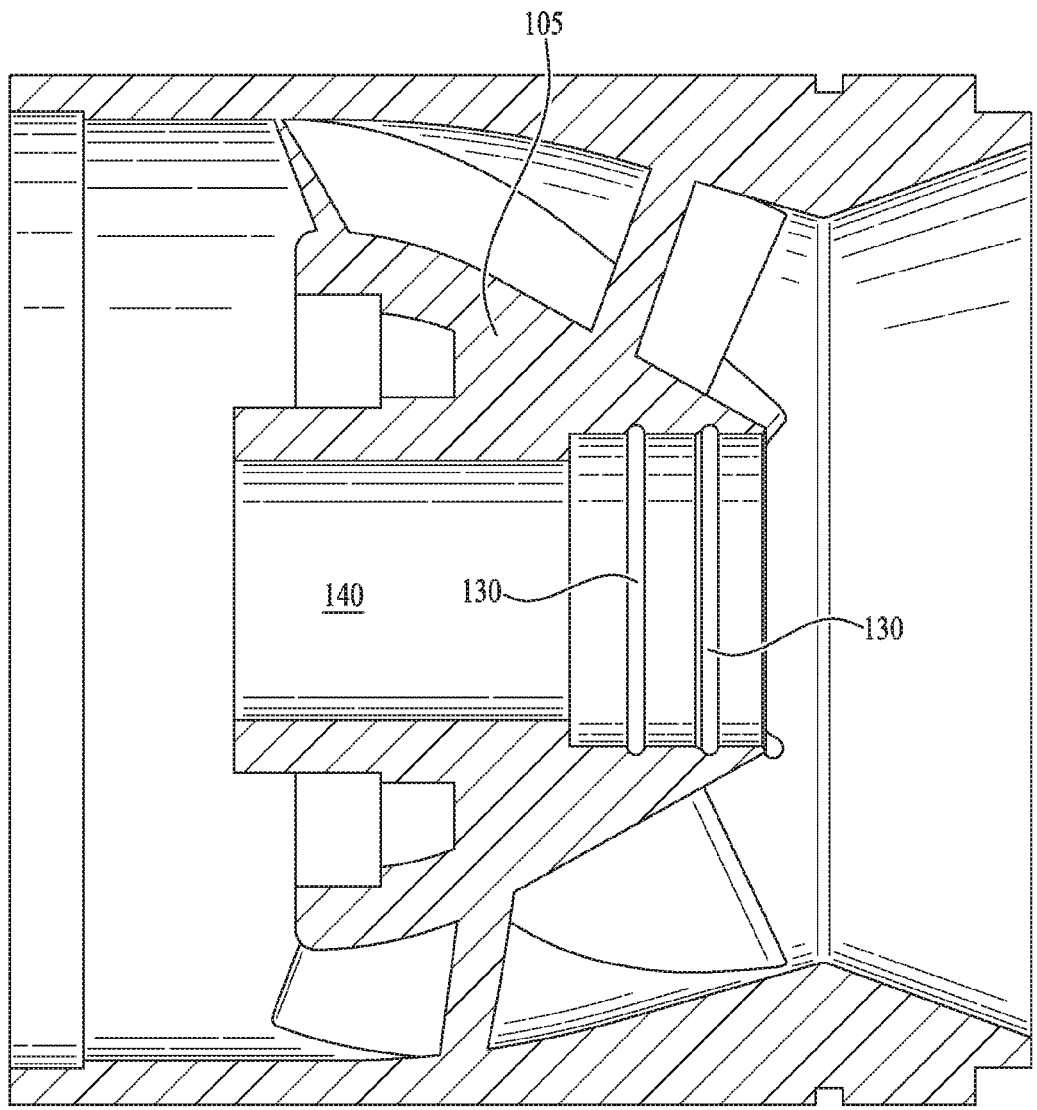
FIG. 5 is a cross sectional view of a grooved diffuser of an illustrative embodiment.
Figure 10A:
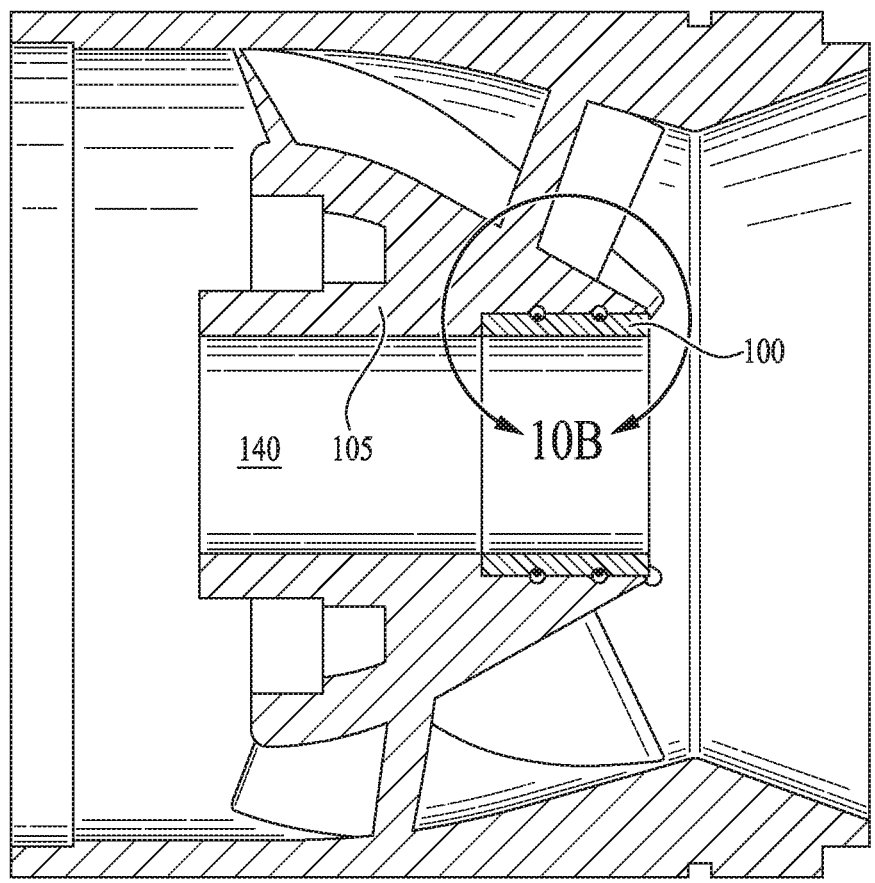
FIG. 10A is a cross sectional view of a stage of an illustrative embodiment with exemplary circumferential keys of an illustrative embodiment at room temperature.
Figure 10B:
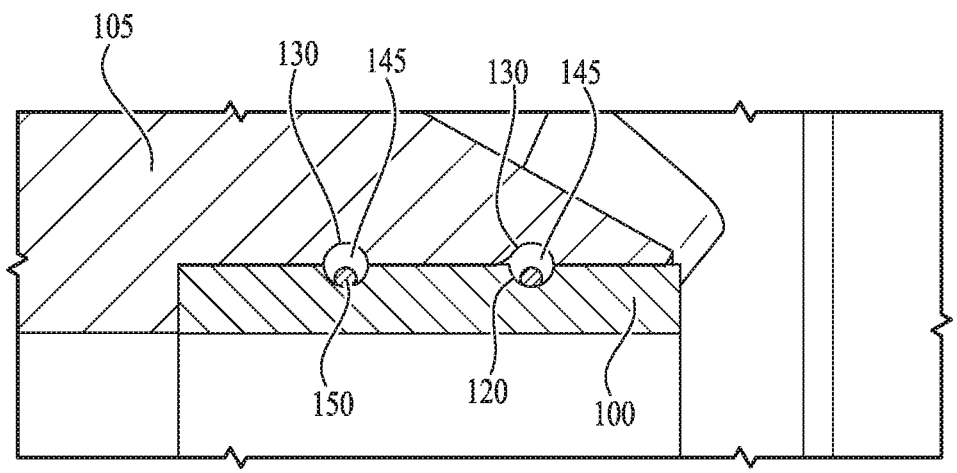
FIG. 10B is an enlarged view of the stage of FIG. 10A at room temperature.

One or more diffuser grooves 130 may be included on an inner diameter of diffuser 105. FIG. 5 illustrates an exemplary embodiment of diffuser grooves 130. In the embodiment shown in FIG. 5, two circumferential bushing grooves 130 are shown. Diffuser grooves 130 may follow the path of bushing grooves 120 such that diffuser grooves 130 and bushing grooves 120 are aligned when bushing 100 is press fit into and/or secured to diffuser 105. For example, circumferential diffuser grooves 130 may follow the path of circumferential bushing grooves 120, such that bushing grooves 120 may align with and/or face diffuser grooves 130 once bushing 100 has been press-fit into diffuser 105. In another example, axial and/or slanted diffuser grooves 130 may follow the path of axial and/or slanted bushing grooves 120, such that bushing grooves 120 may align with and/or face diffuser grooves 130 once bushing 100 has been press-fit into diffuser 105. Bushing 100 and/or diffuser 105 may include one to one-hundred grooves. In one example, diffuser grooves 130 may be machined and bushing grooves 120 may be sintered, cast or machined by electrical discharge machining (EDM). When bushing 100 is pressed into diffuser 105, bushing grooves 120 may face the inner diameter of diffuser 105. As shown in FIGS. 1B and 10B, bushing 100 may press into diffuser 105 inner diameter such that diffuser grooves 130 oppose, face and/or trace bushing grooves 120.

Bushing grooves 120 and/or diffuser grooves 130 may be circumferential, axial, diagonal, wavy or any other shape that may accommodate a key of illustrative embodiments. Bushing grooves 120 may be shallow so as to not reduce the thickness of bushing 100 wall to less than 0.60 inches. Bushing grooves 120 should be small enough so as not to hinder the compressive strength of bushing 100. In some embodiments, diffuser grooves 130 may be about 0.010 inches deep and between about 0.032 and 0.035 inches wide. In certain embodiments, bushing grooves 120 may extend circumferentially around the entire outer diameter of bushing 100 and may face diffuser grooves 130, which may extend the around the entire inner circumference of diffuser 105. In some embodiments, a single bushing groove 120 and a single diffuser groove 130 may have a width around 50% of the height of bushing 100, such as to seat the exemplary cuff-shaped key shown in FIG. 7.

Bushing grooves 120 and diffuser grooves 130 may be similarly sized and/or shaped to one another, for example as illustrated in FIG. 10B where each of bushing grooves 120 and diffuser grooves 130 are semi-spherical in shape and/or in FIG. 4B where each of bushing grooves 120 and diffuser grooves 130 are shown rectangular shaped. In some embodiments, bushing grooves 120 may be sized and/or shaped differently from diffuser grooves 130, although the path of bushing grooves 120 may still track diffuser grooves 130 despite the differing groove shapes. For example, in the embodiment shown in FIG. 1B, diffuser groove 130 is shown rectangular shaped and shallower than bushing groove 120, which bushing groove 120 is shown as a rounded channel. The dimensions and/or shape of bushing grooves 120, diffuser grooves 130, and key 150 may be determined by careful attention to maintaining integrity of bushing 100, conditions of operation, such as radial and thrust loads, pump size and type, component materials and the associated differences in thermal expansion between those materials, and/or environmental conditions such as expected temperature changes experience by the ESP assembly of illustrative embodiments.

Figure 6:
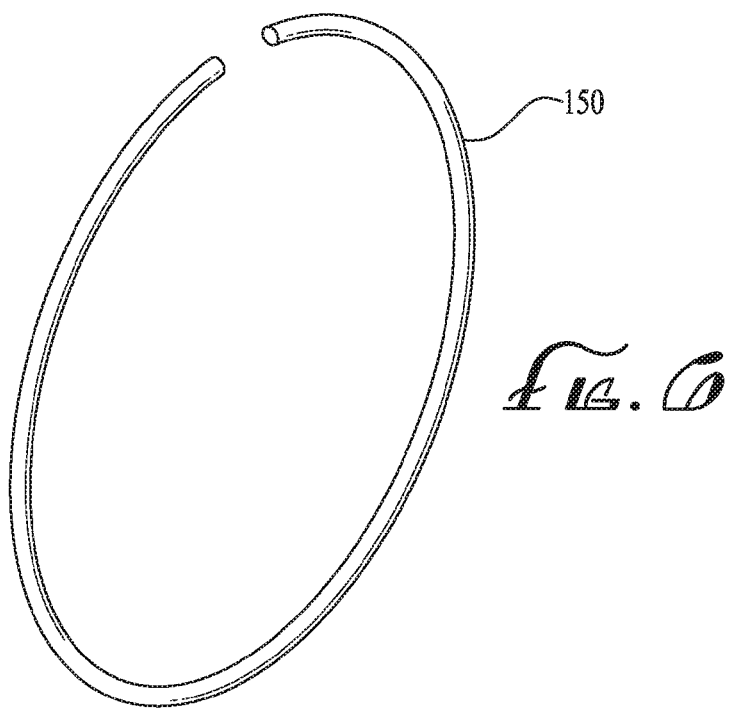
FIG. 6 is a perspective view of a circumferential key of an illustrative embodiment.
Figure 7:
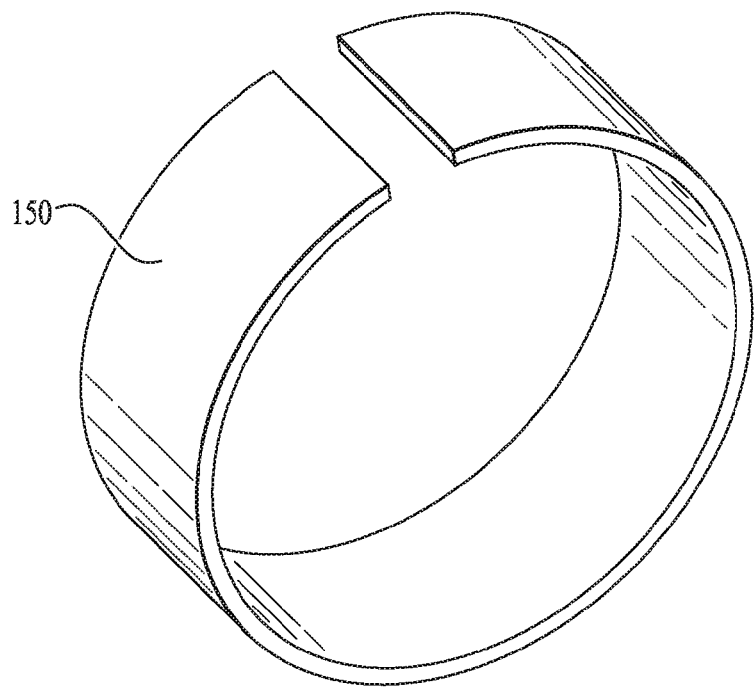
FIG. 7 is a perspective view of a cuff-shaped key of an illustrative embodiment.

Key 150 may be placed in each bushing groove 120. Key 150 may be seated in bushing groove 120 prior to press-fitting and/or securing bushing 100 into diffuser 105. FIG. 6 and FIG. 7 illustrate exemplary keys 150 of illustrative embodiments. Key 150 may be a wire, ring, wedge, bolt, pin or fastener. Key 150 may be made of a high thermal expansion material (HTEM) and in some embodiments have a thermal expansion coefficient of about $1.68 \times 10^{-5}$ in/in/° F. For example, key 150 may be aluminum, an aluminum and zinc alloy, steel or another material having a high thermal coefficient of expansion as compared to the material of diffuser 105. In one example, the material of key 150 may increase 38% faster than the material of diffuser 105 during an increase in ambient temperatures. In some embodiments, key 150 may be a rubber such as ethylene propylene diene monomer (EPDM), a fluororubber o-ring such as an Aflas® (a registered trademark of Asahi Glass Co., Ltd.) o-ring, or another material with similar thermal properties.

In some embodiments, rather than, or in addition to, key 150 being thermally expandable and/or a HTEM, volumetric expansion (swell) of key 150 may be liquid activated. For example, the material of key 150 may expand when key 150 contacts oil, water and/or salt. The material of key 150 may include EPDM, which expands when contacted by oil, and also expands with temperature increase. In some embodiments, key 150 may be a hydromorphic and/or hydrophilic polymer.

Key 150 may be C-shaped, round and/or cuff shaped in embodiments where bushing grooves 120 are circumferential. A C-shaped wire may be simple to install around bushing 100 outer diameter, for example in embodiments where key 150 is not elastic or stretchy, such as where key 150 is an aluminum or steel wire. In such an example, key 150 may extend around about 90% of the circumference of bushing groove 120 in order to allow simple placement of key 150 in bushing groove 120 and/or allow for length expansion of key 150. In other embodiments, key 150 may extend up to 99% of the circumference of bushing groove 120 or entirely around the circumference of bushing groove 120. In embodiments where bushing grooves 120 are axial, diagonal, helical or another shape, key 150 may be slightly shorter than the applicable bushing groove 120 and/or the same length as bushing groove 120. In embodiments where key 150 is capable of stretching and returning to size during insertion, such as in EPDM embodiments, key 150 may be ring-shaped. Key 150 should fit just inside bushing groove 120 at room temperature (about 75° F.). For example, where bushing groove 120 is 0.030 inches in depth and key 150 is a wire, the outer diameter of the wire may be between 0.030-0.032 inches at room temperature and/or 75° F.

Figure 8:
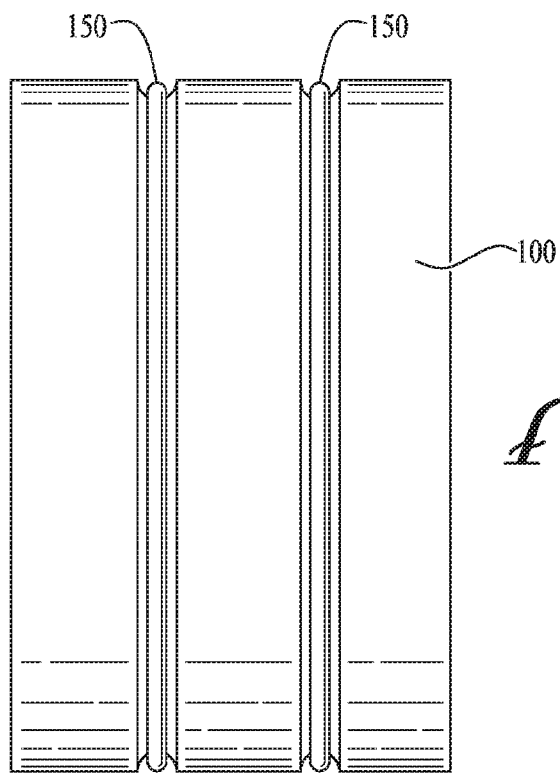
FIG. 8 is a perspective view of grooved bushing with seated keys of an illustrative embodiment.
Figure 9:
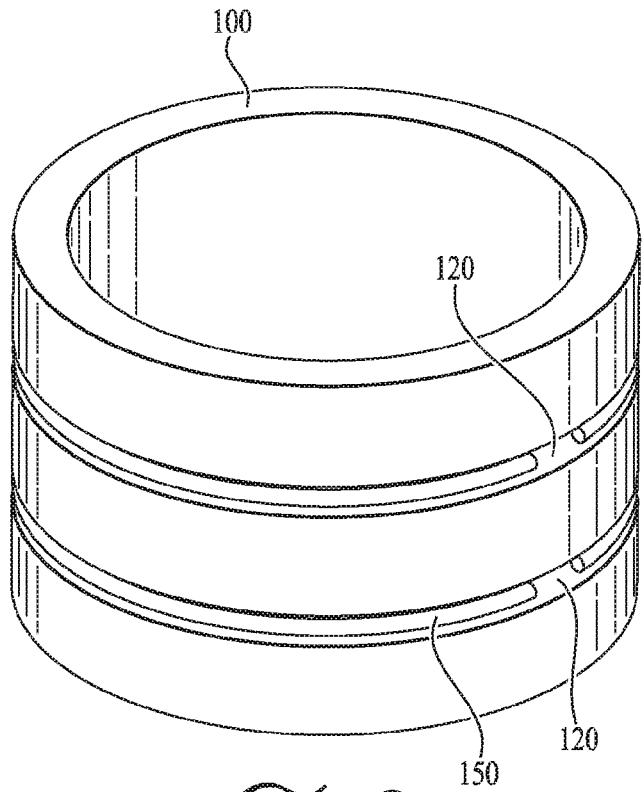
FIG. 9 is a perspective view of a grooved bushing with seated keys of an illustrative embodiment.

Key 150 may be placed on, about and/or around bushing 100 prior to press-fitting bushing 100 into diffuser 105. When initially placed, key 150 should not substantially extend past the outer diameter of bushing 100 (e.g., not more than 0.002 inches) so as not interfere to with the process of pressing bushing 100 into diffuser 105. Thus, prior to expansion and/or during placement of key 150, key 150 should not substantially extend into diffuser groove 130 thereby leaving space 145 (shown in FIGS. 4B and 10B). In the example shown in FIG. 10B, the diameter of key 150 during installation may be shorter than the depth of the bushing groove 120. In the example shown in FIG. 4B, the diameter of key 150 during installation at room temperature may be about the same as the depth of bushing groove 120. These sizing examples may assist in reducing interference of key 150 during press-fit. Interfering with the press-fit may cause bushing 100 misalignment, breaking of bushing 100, cracks on bushing 100 and/or diffuser 105 cracks, all of which should be avoided by employing a sufficiently small room temperature key 150 and/or a suitable bushing groove 120 to key 150 ratio. FIG. 8-FIG. 10B illustrate bushing 100 with key 150 placed into bushing grooves 120 at room temperature. FIG. 8 and FIG. 9 illustrate bushing 100 with key 150 prior to press-fitting of bushing into diffuser 105 at room temperature. FIG. 10A-10B illustrate bushing 100 with key 150 press-fit into diffuser 105 at room temperature.

A retaining compound, grease and/or glue such as Loctite may be applied to bushing 100 once key 150 is in place, to reduce friction during press-fit and then assist in locking bushing 100 into position. The retaining compound, adhesive and/or grease may assist in keeping key 150 in position and may ensure that key 150 does not fall off during assembly. Unseating of key 150 may cause bushing 100 to crack, break or become misaligned, and care should be taken to avoid such circumstances. In one example, tape or glue may keep key 150 in place in order to prevent key 150 from becoming unseated in groove 120.

Figure 11A:
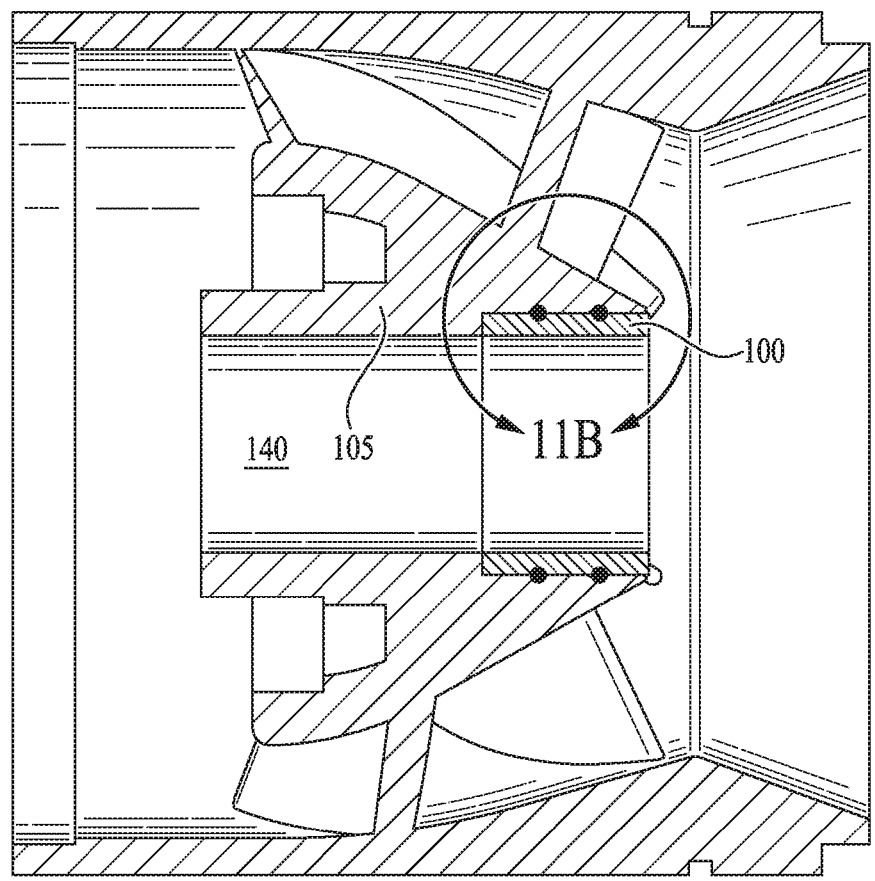
FIG. 11A is a cross sectional view of a stage of an illustrative embodiment with an exemplary volumetrically expanded key of an illustrative embodiment.
Figure 11B:
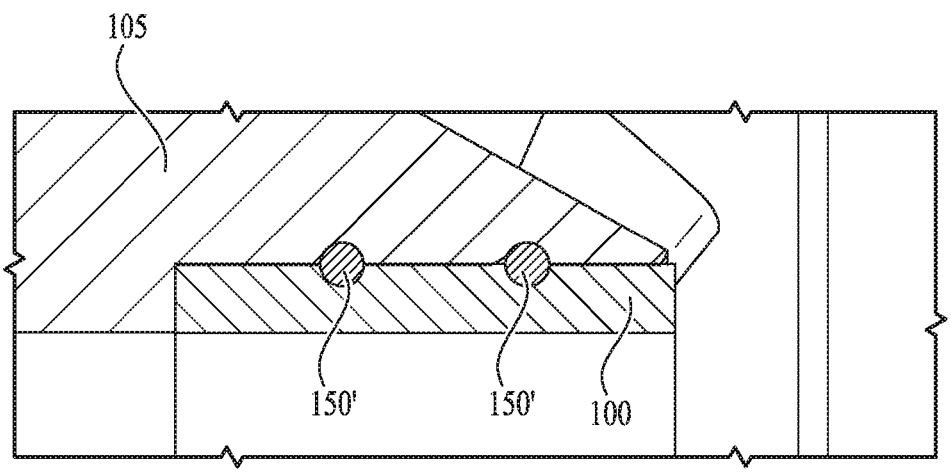
FIG. 11B is an enlarged view of the stage with volumetrically expanded key of FIG. 11A.

When the ESP assembly is put into operation, for example downhole in an oil, gas and/or water well, the temperature of the assembly may rise. In one example, the ESP assembly may increase from 75° F. during assembly to 220°-300° F., and in some instances, up to 600° F. during operation. As the temperature rises, the materials of diffuser 105 and bushing 100 may experience thermal expansion. As the temperature increases, key 150 may expand faster than diffuser 105 and/or bushing 100 expand, due to the higher coefficient of thermal expansion of key 150 as compared to diffuser 105 and/or due to liquid-activated expansion. FIGS. 11A-11B and FIG. 1C illustrate a volumetrically expanded key 150'. Key 150 may expand volumetrically and/or in length, filling or at least partially filling space 145. Expansion may be thermally activated and/or activated by contact with liquid. As key 150 expands volumetrically and/or outwards into diffuser groove 130, it may wedge bushing 100 in place with respect to diffuser 105, causing a mechanical lock such that bushing 100 may not slip out of place, dislodge or rotate despite expansion (or differing expansion rates) of diffuser 105 and/or bushing 100. Thermally and/or volumetrically expanded key 150' may allow the bearing set including bushing 100 and sleeve 110 to carry gravitational and/or thrust forces despite expansion of its components, and may also provide a rotational lock to ensure that bushing 100 does not rotate with sleeve 110. In one example, key 150 may expand about 0.5% times in volume as the temperature of the system increases up to 500° F. Diffuser grooves 130 may receive expanded key 150' and strengthen the mechanical lock provided by key 150' pressed between diffuser 105 and bushing 100, for example as illustrated in FIG. 1C and FIG. 11B. In some embodiments, diffuser grooves 130 may not be necessary and the force of expanded key 150' pressing against the inner diameter of diffuser 105 may provide a mechanical lock sufficient to secure bushing 100 in place without slipping despite thermal expansion of diffuser 105 and/or bushing 100.

Figure 12:
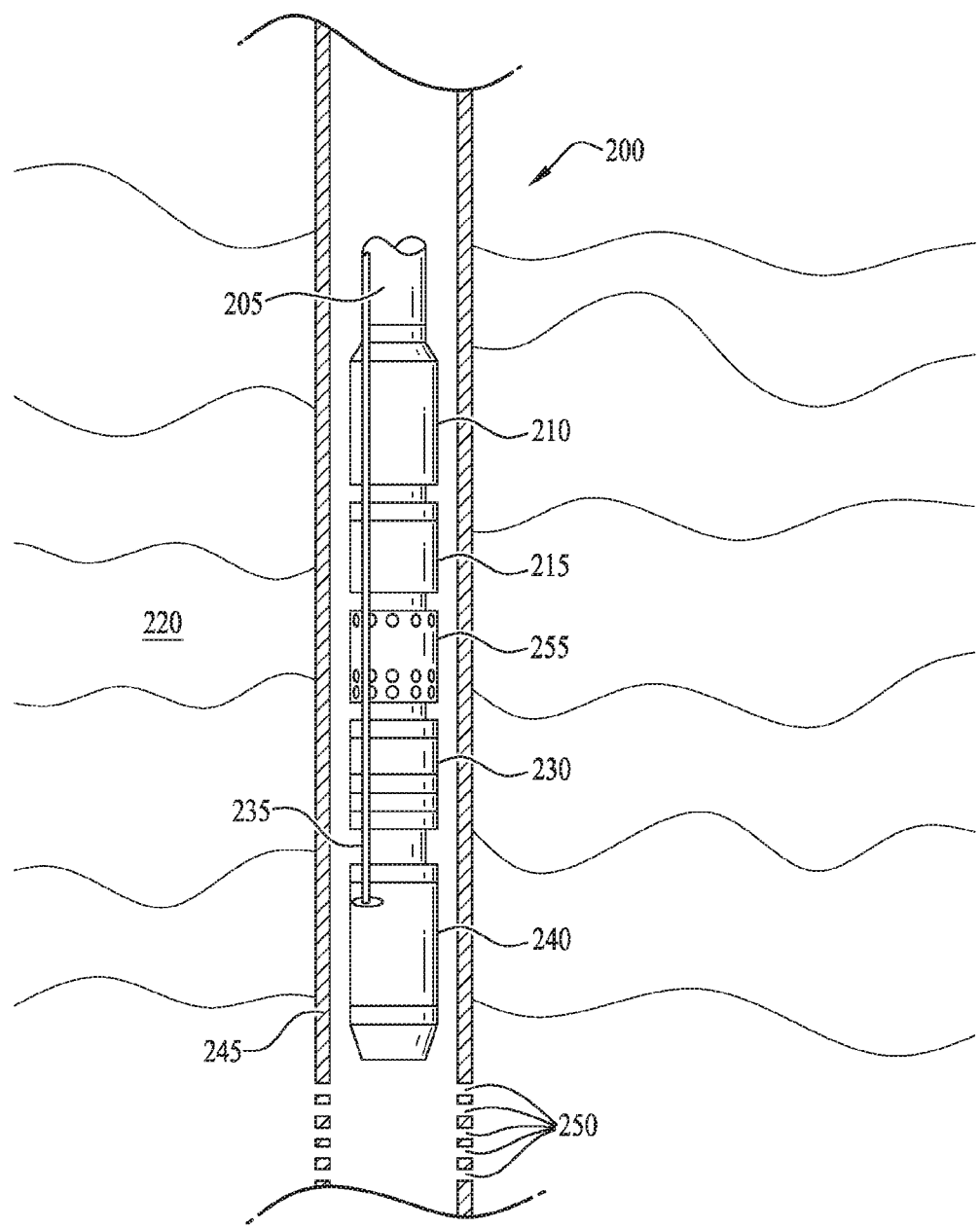
FIG. 12 is a perspective view of a downhole electric submersible pump (ESP) assembly of illustrative embodiments.

FIG. 12 illustrates an exemplary ESP assembly arranged to pump natural gas and/or oil from underground formation 220 and making use of the press-fit bearing system of illustrative embodiments. As illustrated, the system of ESP assembly 200 may include well bore casing 245 with casing perforations 250 that allows well fluid to enter casing 245. ESP motor 240 may be a two pole, three phase squirrel cage induction motor that operates to turn ESP pump 210. Motor lead extension 235 and the electrical cable above it (not shown) may connect to a power source at the surface of the well and provide power to ESP motor 240. ESP seal 230 may supply oil to the motor and provide pressure equalization to allow for expansion of motor oil in the well bore. In some embodiments, an ESP intake may serve as the intake for fluid into ESP pump 210. As shown in FIG. 12, in certain embodiments, gas separator 255 may serve as the intake in gassy wells. ESP charge pump 215, which maybe a lower tandem pump, may be employed in gassy wells. ESP pump 210 may be a multistage centrifugal pump including impeller 135 and diffuser 105 stages stacked around shaft 140 to lift fluid to the surface of the well. Production tubing 205 may carry pumped fluid to piping and/or storage tanks on the surface, for example. One or more of these system components may make use of the press-fit bearing system and/or HTEM key 150 of illustrative embodiments. In some embodiments, key 150, diffuser grooves 130 and/or bushing grooves 120 of illustrative embodiments may be employed in ESP pump 210, ESP charge pump 215 and/or gas separator 255. For example, gas separator 255 may include impeller 135 and diffuser 105 stages to increase the pressure of the fluid during compression and separation of gases. Similarly, in gassy wells charge pump 215 may be used in tandem with a primary centrifugal pump, such as ESP pump 210, and may also employ stages.

A press-fit bearing locking system, apparatus and method has been described. Illustrative embodiments may allow a bushing to remain seated within a diffuser in high temperature applications, while still carrying thrust and/or providing radial support. The key of illustrative embodiments, placed within shallow grooves on the outer diameter of the bushing, may expand volumetrically at a faster rate than the composite bushing and diffuser materials. This may create a seal and/or lock around the bushing so that the bushing does not slide out when acted upon by gravity, despite thermal expansion. The mechanical locking may also provide rotational resistance to the rotating sleeve that is paired with the bushing. The bushing grooves may be small so as not to hinder the composing bushing strength and/or to allow press-fit installation. Multiple grooves with seated keys may be employed along the length of the bushing and/or extending circumferentially about the bushing outer diameter.

Further modifications and alternative embodiments of various aspects of the invention may be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the scope and range of equivalents as described in the following claims. In addition, it is to be understood that features described herein independently may, in certain embodiments, be combined.

The invention claimed is:

1. A press-fit bearing locking system comprising:
a rotatable impeller paired with a diffuser;
the diffuser having a diffuser groove on an inner diameter of the diffuser;
a bushing comprising an outer diameter press-fit into the grooved inner diameter of the diffuser;
the outer diameter of the bushing having a bushing groove;
the bushing groove tracing a path of the diffuser groove; and
a high thermal expansion material (HTEM) key seated within the bushing groove.

2. The press-fit bearing locking system of claim 1, wherein the bushing groove extends circumferentially around the outer diameter of the bushing, and the diffuser groove extends circumferentially around the inner diameter of the diffuser.

3. The press-fit bearing locking system of claim 2, wherein the HTEM key is a C-shaped wire extending around about 90% of the outer diameter of the bushing.

4. The press-fit bearing locking system of claim 2, wherein there are a plurality of bushing grooves extending circumferentially around the outer diameter of the bushing, and a plurality of diffuser grooves extending circumferentially around the inner diameter of the diffuser, each of the circumferential bushing grooves tracing a path of one of the plurality of circumferentially extending diffuser grooves.

5. The press-fit bearing locking system of claim 1, wherein the bushing groove extends axially along the outer diameter of the bushing, and the diffuser groove extends axially along the inner diameter of the diffuser.

6. The press-fit bearing locking system of claim 5, wherein there are a plurality of axially extending bushing grooves and a plurality of axially extending diffuser grooves, each of the axially extending bushing grooves tracing a path of one of the plurality of axially extending diffuser grooves.

7. The press-fit bearing locking system of claim 6, wherein the plurality of axially extending bushing grooves are spaced circumferentially about the outer diameter of the bushing.

8. The press-fit bearing locking system of claim 1, wherein the HTEM key comprises a wire.

9. The press-fit bearing locking system of claim 1, wherein the rotatable impeller and the diffuser form a gas separator stage.

10. The press-fit bearing locking system of claim 1, wherein the bushing groove extends circumferentially about the bushing and the HTEM key is a wire extending around between 90% and 99% of the outer diameter of the bushing.

11. The press-fit bearing locking system of claim 1, wherein the bushing groove extends circumferentially about the bushing and the HTEM key is a wire extending entirely around the circumference of the bushing.

12. The press-fit bearing locking system of claim 1, wherein the HTEM key is one of an ethylene propylene diene monomer (EPDM) ring or rubber elastomeric ring.

13. The press-fit bearing locking system of claim 1, further comprising an adhesive between the outer diameter of the bushing and the inner diameter of the diffuser.

14. The press-fit bearing locking system of claim 1, wherein a width of the bushing groove is about 50% of a height of the bushing.

15. A bearing locking system comprising:
a rotatable impeller paired with a diffuser;
the diffuser having a diffuser groove on an inner diameter of the diffuser;
a bushing comprising an outer diameter secured to the grooved inner diameter of the diffuser;
the outer diameter of the bushing having a bushing groove;
the bushing groove tracing a path of the diffuser groove; and
a volumetrically expandable key seated within the bushing groove.

16. The bearing locking system of claim 15, wherein the outer diameter of the bushing is secured to the grooved inner diameter of the diffuser by one of a glue, a snap ring, or a combination thereof.

17. The bearing locking system of claim 15, wherein volumetric expansion of the key is liquid-activated.

18. The bearing locking system of claim 17, wherein volumetric expansion of the key is activated by contact with oil.

19. The bearing locking system of claim 18, wherein the volumetrically expandable key comprises ethylene propylene diene monomer (EPDM).

20. The bearing locking system of claim 17, wherein volumetric expansion of the key is one of water or salt activated.

21. The bearing locking system of claim 17, wherein volumetric expansion of the key is heat activated.

22. The bearing locking system of claim 17, wherein volumetric expansion of the key is at least partially heat activated and at least partially liquid activated.

23. The bearing locking system of claim 15, wherein the outer diameter of the bushing is secured to the grooved inner diameter of the diffuser by interference fit.

* * * * *